United States Patent
Xu

(10) Patent No.: US 9,395,574 B2
(45) Date of Patent: Jul. 19, 2016

(54) LIQUID CRYSTAL DISPLAY HAVING BLACK MATRIX MADE OF MOLYBDENUM

(71) Applicant: Shenzhen China Star Optoelectronics Technology Co., Ltd., Shenzhen, Guangdong (CN)

(72) Inventor: Liang Xu, Guangdong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 0 days.

(21) Appl. No.: 14/416,629

(22) PCT Filed: Aug. 7, 2014

(86) PCT No.: PCT/CN2014/083896
§ 371 (c)(1),
(2) Date: Jan. 22, 2015

(87) PCT Pub. No.: WO2016/015352
PCT Pub. Date: Feb. 4, 2016

(65) Prior Publication Data
US 2016/0033811 A1 Feb. 4, 2016

(30) Foreign Application Priority Data
Jul. 31, 2014 (CN) .......................... 2014 1 0374562

(51) Int. Cl.
*H01L 35/24* (2006.01)
*G02F 1/1335* (2006.01)
*G02F 1/1362* (2006.01)

(52) U.S. Cl.
CPC .................. *G02F 1/133512* (2013.01); *G02F 2001/136222* (2013.01)

(58) Field of Classification Search
CPC ............ G02F 1/133514; G02F 1/1368; G02F 1/133512; G02F 1/1339; G02F 1/136209
USPC .............................. 349/110–113; 257/40, 43
See application file for complete search history.

(56) References Cited

U.S. PATENT DOCUMENTS

| 8,300,173 | B2* | 10/2012 | Peng ................. | G02F 1/133553 349/63 |
| 2002/0131008 | A1* | 9/2002 | Iwase ................. | H01L 51/5237 349/153 |
| 2011/0310057 | A1* | 12/2011 | Wang ................. | G02F 1/13338 345/174 |
| 2016/0033836 | A1* | 2/2016 | Chen ........................ | G02F 1/15 359/275 |

* cited by examiner

*Primary Examiner* — Dung Le
(74) *Attorney, Agent, or Firm* — Andrew C. Cheng

(57) ABSTRACT

A liquid crystal display includes a first substrate, which includes a first surface and a second surface opposite to the first surface, the first surface of the first substrate including a TFT array and a color filter layer formed thereon, the color filter layer including a plurality of color filter units arranged in an array and gaps formed between adjacent color filter units; and a second substrate, which includes a third surface and a fourth surface opposite to the third surface, the third surface and the first surface facing each other, the third surface including a black matrix layer formed thereon and including a plurality of black matrixes respectively corresponding to the gaps between the plurality of color filter units, the black matrix layer including a layer of a transparent conductive film coated thereon. The material of the black matrix layer is molybdenum.

8 Claims, 14 Drawing Sheets

LIQUID CRYSTAL DISPLAY HAVING BLACK MATRIX MADE OF MOLYBDENUM

CROSS REFERENCE TO RELATED APPLICATIONS

This application claims the priority of Chinese Patent Application No. 201410374562.2, entitled "Liquid Crystal Display and Method for Manufacturing Liquid Crystal Display", filed on Jul. 31, 2014, the disclosure of which is incorporated herein by reference in its entirety.

BACKGROUND OF THE INVENTION

1. Field of the Invention

The present invention relates to the field of liquid crystal displaying, and in particular to a liquid crystal display and a method for manufacturing a liquid crystal display.

2. The Related Arts

Liquid crystal displays are a common electronic device that has a wide application in daily living of people. A liquid crystal display generally comprises two substrates, which are an upper substrate and a lower substrate. Liquid crystal molecules are arranged between the upper substrate and the lower substrate to form the liquid crystal display. The upper substrate comprises a black matrix (BM) formed thereon. Heretofore, the material that is used to make a black matrix is chromium (Cr) or an organic material. Chromium is a heavy metal that causes pollution to the environment. When the material that is used to make the black matrix is chromium and an organic material, the black matrix made thereof has a great thickness (generally one micrometer). A black matrix with a great thickness is adverse to liquid crystal molecules flowing thereby making the quality of the liquid crystal display poor.

SUMMARY OF THE INVENTION

The present invention provides a liquid crystal display and the quality of the liquid crystal display is enhanced.

In a first aspect, a liquid crystal display is provided. The liquid crystal display comprises:

a first substrate, which comprises a first surface and a second surface opposite to the first surface, the first surface of the first substrate comprising a thin-film transistor (TFT) array and a color filter layer formed thereon, the color filter layer comprising a plurality of color filter units arranged in an array, gaps formed between the color filter units; and a second substrate, which comprises a third surface and a fourth surface opposite to the third surface, the third surface and the first surface facing each other, the third surface comprising a black matrix layer formed thereon, the black matrix layer comprising a plurality of black matrixes, the black matrixes being arranged to correspond to the gaps between the plurality of color filter units, the black matrix layer being coated thereon with a layer of transparent conductive film, a material that makes the black matrix layer being molybdenum.

In a first embodiment of the first aspect, the black matrixes have a thickness of 100 angstroms to 1000 angstroms.

In a second embodiment of the first aspect, the liquid crystal display further comprises a photo spacer, the photo spacer being formed on the transparent conductive film and the photo spacer being arranged to correspond to an edge of the third surface of the second substrate, the photo spacer functioning to support between the first substrate and the second substrate.

In a third embodiment of the first aspect, the second substrate further comprises a protection layer, the protection layer being set on and covering the transparent conductive film.

In combination with the third embodiment of the first aspect, in a fourth embodiment, the liquid crystal display further comprises a photo spacer, the photo spacer being formed on the protection layer and the photo spacer being arranged to correspond to an edge of the third surface of the second substrate, the photo spacer functioning to support between the first substrate and the second substrate.

In combination with the third embodiment of the first aspect, in a fifth embodiment, the protection layer comprises a nitrogen-silicon compound.

In combination with the fifth embodiment of the first aspect, in a sixth embodiment, the protection layer has a thickness of 300 angstroms.

In a seventh embodiment, a material of the transparent conductive film is indium tin oxide (ITO), the ITO having a thickness of 300 angstroms to 600 angstroms.

In a second aspect, a method for manufacturing a liquid crystal display is provided. The method for manufacturing a liquid crystal display comprises the following steps:

providing a first substrate, wherein the first substrate comprises a first surface and a second surface opposite to the first surface;

forming a thin-film transistor (TFT) array and a color filter layer on the first surface, wherein the color filter layer comprises a plurality of color filter units arranged in an array with gaps formed between adjacent ones of the color filter units;

providing a second substrate, wherein the second substrate comprises a third surface and a fourth surface opposite to the third surface and the third surface and the first surface face each other;

arranging a black matrix layer on the third surface, wherein the black matrix layer comprises a plurality of black matrixes and the black matrixes are set to correspond to the gaps between the filter units, wherein a material of the black matrix layer is molybdenum; and coating a transparent conductive film on the black matrix layer.

In a first embodiment of the second aspect, the step of "arranging a black matrix layer on the third surface, wherein the black matrix layer comprises a plurality of black matrixes and the black matrixes are set to correspond to the gaps between the filter units, wherein a material of the black matrix layer is molybdenum" comprises:

forming a molybdenum metal layer through sputtering on the third surface; and subjecting the molybdenum metal layer to patternization to form a plurality of black matrixes in such a way that the black matrixes respectively corresponding to the gaps of the plurality of color filter units, the black matrixes collectively defining the black matrix layer.

In a second embodiment of the second aspect, the black matrixes have a thickness of 100 angstroms to 1000 angstroms.

In a third embodiment of the second aspect, the method for manufacturing the liquid crystal display further comprises:

forming a photo spacer on the transparent conductive film in such a way that the photo spacer is set to correspond to an edge of the third surface of the second substrate and the photo spacer functions to support between the first substrate and the second substrate.

In combination with the third embodiment of the second aspect, in a fourth embodiment, the step of "forming a photo spacer on the transparent conductive film in such a way that the photo spacer is set to correspond to an edge of the third surface of the second substrate and the photo spacer functions to support between the first substrate and the second substrate" comprises:

forming a spacer layer on the transparent conductive film and patternizing the spacer layer so as to form the photo spacer on the transparent conductive film in such a way that the photo spacer is set to correspond to the edge of the third surface of the second substrate.

In a fifth embodiment of the second aspect, the method for manufacturing the liquid crystal display further comprises:

setting a protection layer to cover the transparent conductive film; and forming a photo spacer on the protection layer in such a way that the photo spacer is set to correspond to an edge of the third surface of the second substrate and the photo spacer functions to support between the first substrate and the second substrate.

In combination with the fifth embodiment of the second aspect, in a sixth embodiment, the step of "forming a photo spacer on the protection layer in such a way that the photo spacer is set to correspond to an edge of the third surface of the second substrate and the photo spacer functions to support between the first substrate and the second substrate" comprises:

forming a spacer layer on the protection layer and patternizing the spacer layer so as to form the photo spacer on the protection layer in such a way that the photo spacer is set to correspond to the edge of the third surface of the second substrate.

In combination with the fifth embodiment of the second aspect, in a sixth embodiment, the protection layer comprises a nitrogen-silicon compound.

In combination with the sixth embodiment of the second aspect, the protection layer has a thickness of 300 angstroms.

In a seventh embodiment of the second aspect, the black matrixes have a thickness of 100 angstroms to 1000 angstroms.

In an eighth embodiment of the second aspect, a material of the transparent conductive film is indium tin oxide (ITO), the ITO having a thickness of 300 angstroms to 600 angstroms.

Compared to the prior art techniques, in the method for manufacturing a liquid crystal display according to the present invention, since the material of the black matrix layer is molybdenum and molybdenum does not cause pollution to the environment, the liquid crystal display provided by the present invention is more environment-friendly. Further, since the material of the black matrixes is molybdenum, the black matrixes may be formed of a thickness of 100 angstroms to 1000 angstroms. The prior art black matrixes, however, generally have thicknesses of 1 micrometer. Thus, compared to the prior art, the black matrixes of the present invention has a thickness that is less than the thickness of the prior art black matrixes, thus facilitating spreading of the liquid crystal molecules arranged between the first substrate and the second substrate and also facilitating spreading of an alignment solution to thereby enhance the quality of the liquid crystal display so manufactured.

BRIEF DESCRIPTION OF THE DRAWINGS

To more clearly explain the technical solution proposed in an embodiment of the present invention and that of the prior art, a brief description of the drawings that are necessary for describing embodiments is given as follows. It is obvious that the drawings that will be described below show only some embodiments. For those having ordinary skills of the art, other drawings may also be readily available from these attached drawings without the expense of creative effort and endeavor.

DETAILED DESCRIPTION OF THE PREFERRED EMBODIMENTS

A clear and complete description will be given to a technical solution of embodiments of the present invention with reference to the attached drawings of the embodiments of the present invention. However, the embodiments so described are only some, but not all, of the embodiments of the present invention. Other embodiments that are available to those having ordinary skills of the art without the expense of creative effort and endeavor are considered belonging to the scope of protection of the present invention.

Figure 1:
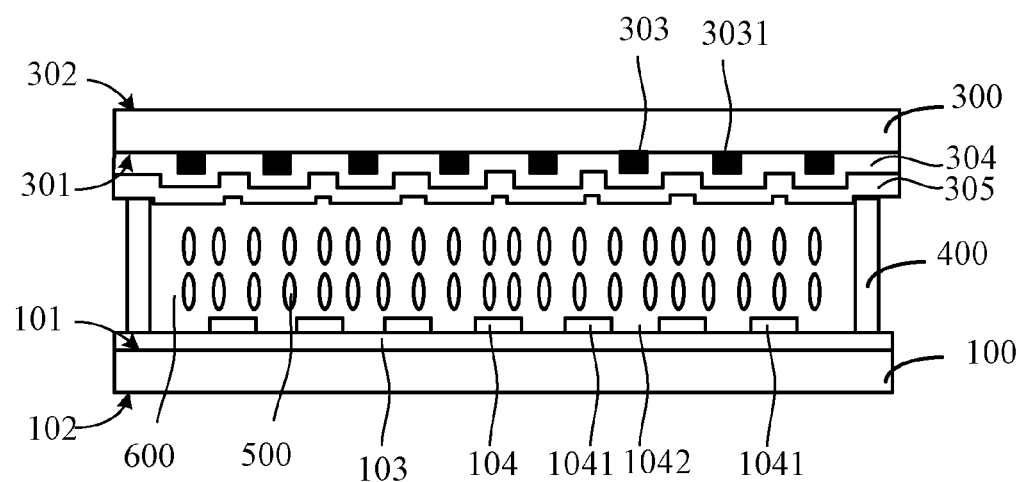
FIG. 1 is a schematic view showing the structure of a liquid crystal display according to a preferred embodiment of the present invention.

Referring to FIG. 1, FIG. 1 is a schematic view showing a liquid crystal display according to an embodiment of the present invention. The liquid crystal display 1 comprises a first substrate 100 and a second substrate 300. The first substrate 100 comprises a first surface 101 and a second surface 102 opposite to the first surface 101. The first surface 101 of the first substrate 100 comprises a thin-film transistor (TFT) array 103 and a color filter layer 104 formed thereon. The TFT array 103 and the color filter layer 104 are sequentially stacked on the first surface 101 and the TFT array 103 is closer to the first surface 101 than the color filter layer 104 is. The color filter layer 104 comprises a plurality of color filter units 1041 arranged in an array and gaps 1042 are formed between the color filter units. The second substrate 300 comprises a third surface 301 and a fourth surface 302 opposite to the third surface 301. The third surface 301 and the first surface 101 face each other and the third surface 301 comprises a black matrix layer 303 formed thereon. The black matrix layer 303 comprises a plurality of black matrixes 3031 and the black matrixes 3031 are arranged to correspond to the gaps 1042 between the plurality of color filter units 1041. The black matrix layer 303 is coated thereon with a layer of transparent conductive film 304. The material that makes the black matrix layer 303 is molybdenum (Mo). The TFT array 103 comprises a plurality of TFTs and the TFTs and the transparent conductive film 304 are loaded with electrical voltages to control the liquid crystal molecules 500 that are arranged between the first substrate 100 and the second substrate 300 to change direction.

In the liquid crystal display 1 of the present invention, since the material that makes the black matrix layer 303 is molybdenum, and molybdenum does not cause pollution to the environment so that the liquid crystal display 1 provided by the present invention is more environment friendly.

The black matrixes 3031 have a thickness of 100 angstroms to 1000 angstroms.

Since the material of the black matrixes 3031 is molybdenum, the black matrixes 3031 can be formed to have a thickness of 100 angstroms to 1000 angstroms, while in the prior art, the thickness of the black matrix is generally 1 micrometer. Thus, compared to the prior art, the black matrixes 3031 of the present invention has a thickness that is less than the thickness of the prior art black matrixes, thus facilitating spreading of the liquid crystal molecules 500 arranged between the first substrate 100 and the second substrate 300 and also facilitating spreading of an alignment solution to thereby enhance the quality of the liquid crystal display 1.

Forming the black matrix layer 303 can be achieved with the following process. Sputtering is applied to form a molybdenum metal layer on the third surface 301 of the second substrate 300, and then, the molybdenum metal layer is patternized to form the black matrix layer 303. Patternizing of the molybdenum metal layer can be achieved by applying operations of exposure, development, and etching.

Forming the transparent conductive film 304 can be achieved with the following process. Sputtering is applied to form a layer of transparent conductive material on a surface of the black matrix layer 303 so as to form the transparent conductive film 304. The material that is used to make the transparent conductive film 304 can be indium tin oxide (ITO). When the material that makes the transparent conductive film 304 is ITO, the transparent conductive film 304 may have a thickness of 300 angstroms to 600 angstroms.

Preferably, the second substrate 300 further comprises a protection layer 305. The protection layer is set on and covers the transparent conductive film 304 to protect the transparent conductive film 304. The liquid crystal display 1 further comprises a photo spacer 400. The photo spacer 400 is set on the protection layer 305 and the photo spacer 400 is arranged to correspond to an edge of the third surface 301 of the second substrate 300. The photo spacer 400 functions to support between the first substrate 100 and the second substrate 300. The photo spacer 400 and the first substrate 100 and the second substrate 300 delimit therebetween a receiving space 600 and the receiving space 600 receives and contains therein the liquid crystal molecules 500.

Forming the protection layer 305 can be achieved with the following process. Chemical vapor deposition (CVD) is applied to form a protection layer 305 on the transparent conductive film 304 to cover the transparent conductive film 304. The material that makes the protection layer 305 can be nitrogen-silicon compounds (such as SiNx). When the material of the protection layer 305 is nitrogen-silicon compounds, the protection layer 305 can be formed of a thickness of 300 angstroms, or around 300 angstroms.

Forming the photo spacer 400 can be achieved with the following process. A spacer layer is formed on the protection layer 305 and then the spacer layer is patternized to form the photo spacer 400 on the protection layer so that the photo spacer 400 is set to correspond to the third surface 301 of the second substrate 300.

In other embodiments, the second substrate 300 may comprise no protection layer 305 and the photo spacer 400 is directly formed on the transparent conductive film 304 in such a way that the photo spacer 400 is set to correspond to the edge of the third surface 301 of the second substrate 300. The photo spacers 400 functions to support between the first substrate 100 and the second substrate 300. The photo spacers 400 and the first substrate 100 and the second substrate 300 collectively define a receiving space 600 therebetween and the receiving space 600 receives and contains the liquid crystal molecules 500 therein. Under this condition, forming the photo spacer 400 can be achieved with the following process. A spacer layer is formed on the transparent conductive film 304 and then, the spacer layer is patternized to form the photo spacer 400 on the transparent conductive film 304 so that the photo spacer is set to correspond to the third surface 301 of the second substrate 300.

Figure 2:
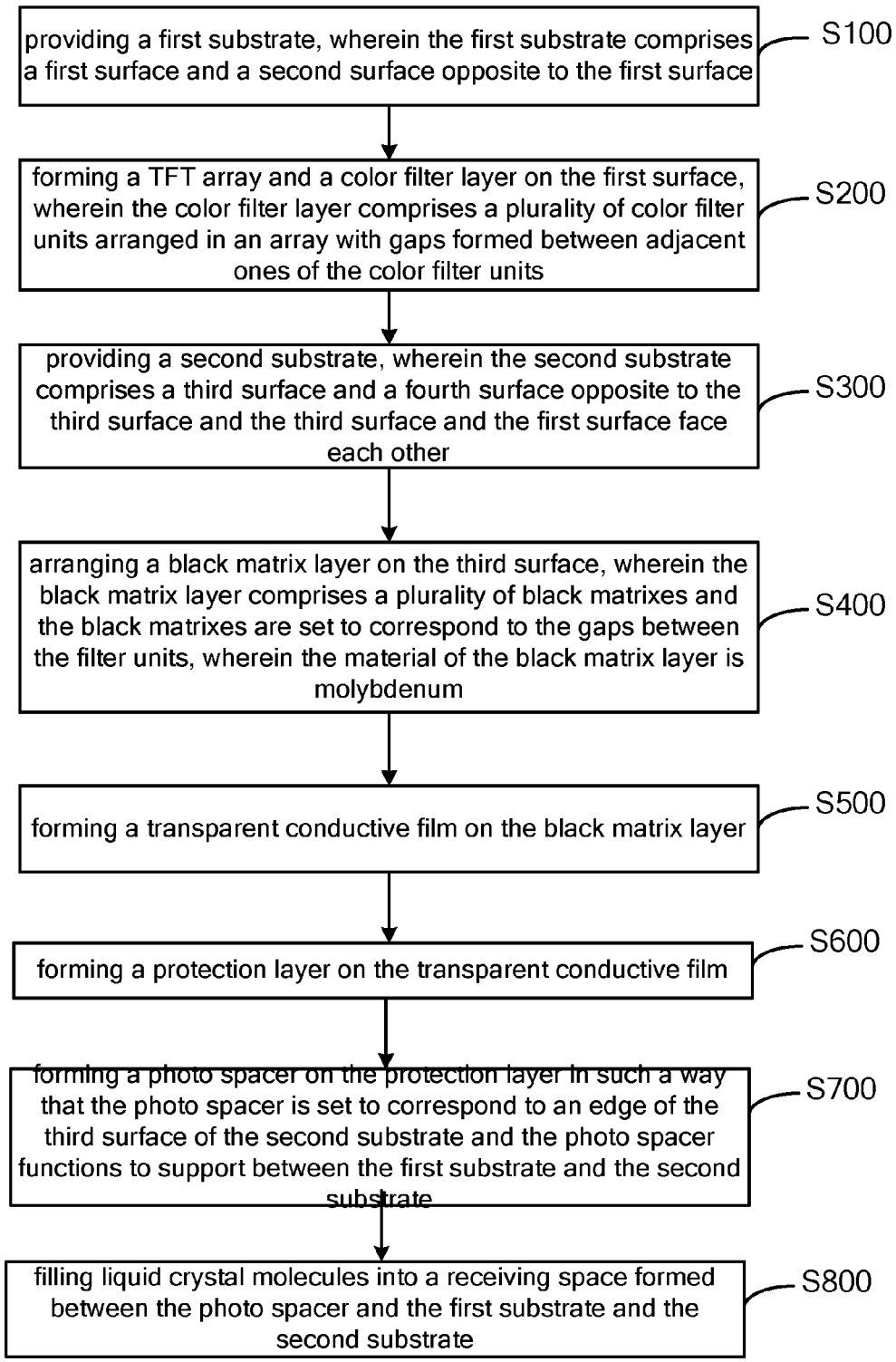
FIG. 2 is a flow chart illustrating a method for manufacturing a liquid crystal display according to a preferred embodiment of the present invention.

A method for manufacturing the liquid crystal display according to the present invention with reference to FIG. 1. Additional reference is also had to FIG. 2 and FIG. 2 is a flow chart illustrating the method for manufacturing the liquid crystal display according to a preferred embodiment of the present invention. The method for manufacturing the liquid crystal display 1 comprises the following steps.

Step S100: providing a first substrate 100, wherein the first substrate 100 comprises a first surface 101 and a second surface 102 opposite to the first surface 101. In the instant embodiment, the first substrate 100 comprises a glass substrate. It can be appreciated that in other embodiments, the first substrate 100 is not limited to a glass substrate.

Step S200: forming a TFT array 103 and a color filter layer 104 on the first surface, wherein the color filter layer 104 comprises a plurality of color filter units 1041 arranged in an array with gaps 1042 formed between adjacent ones of the color filter units 1041.

Figure 3:
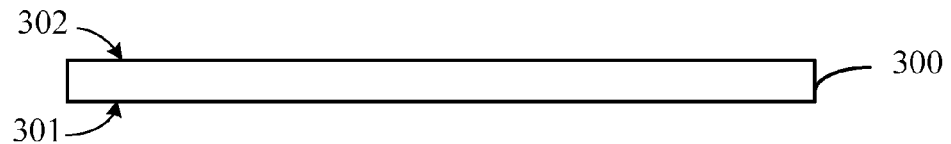
FIGS. 3-8 are cross-sectional views illustrating a second substrate of a liquid crystal display according to the present invention in various steps of a manufacturing process of the second substrate.

Step S300: providing a second substrate 300, wherein the second substrate 300 comprises a third surface 301 and a fourth surface 302 opposite to the third surface 301 and the third surface 301 and the first surface 101 face each other. With additional reference to FIG. 3, in the instant embodiment, the second substrate 300 is a glass substrate. It can be appreciated that in other embodiments, the second substrate 300 is not limited to a glass substrate.

Figure 4:
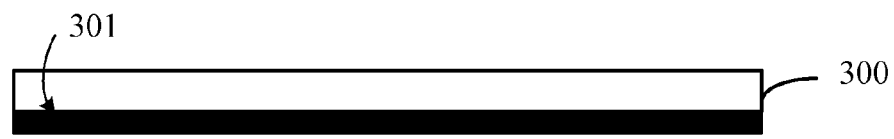
Figure 5:
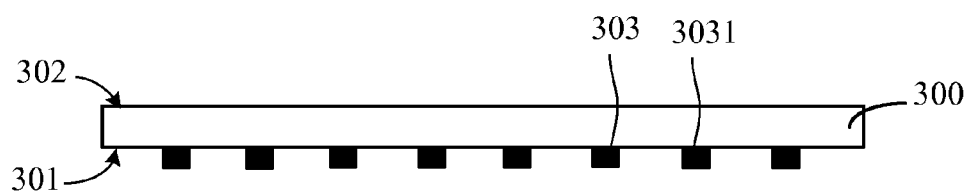

Step S400: arranging a black matrix layer 303 on the third surface 301, wherein the black matrix layer 303 comprises a plurality of black matrixes 3031 and the black matrixes 3031 are set to correspond to the gaps 1042 between the filter units 1041, wherein the material of the black matrix layer 303 is molybdenum. The black matrixes 3031 have a thickness of 100 angstroms to 1000 angstroms. With additional reference to FIG. 4, in this step, sputtering is applied to form a molybdenum metal layer on the third surface 301 of the second substrate 300. With additional reference to FIG. 5, the molybdenum metal layer is then patternized to forming the black matrix layer 303. Patternizing the molybdenum metal layer can be achieved by applying operations of exposure, development, and etching.

Figure 6:
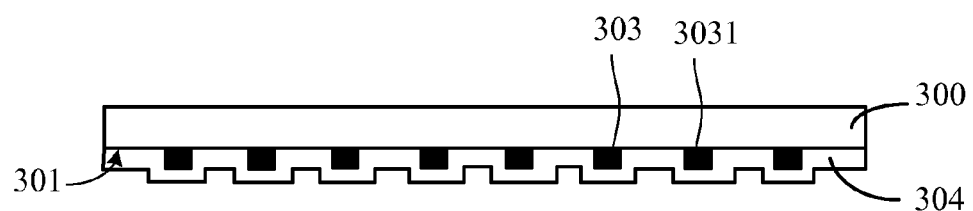

Step S500: forming a transparent conductive film 304 on the black matrix layer 303. With additional reference to FIG. 6, specifically, forming the transparent conductive film 304 can be achieved with the following process. Sputtering is applied to form a layer of a transparent conductive material on a surface of the black matrix layer 303 so as to form the transparent conductive film 304. The material of the transparent conductive film 304 can be indium tin oxide (ITO) and when the material of the transparent conductive film 304 is ITO, the transparent conductive film 304 can be formed of a thickness of 300 angstroms to 600 angstroms.

Figure 7:
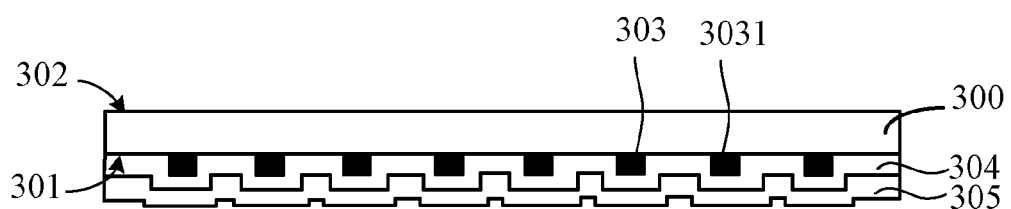

Step S600: forming a protection layer 305 on the transparent conductive film 304. With additional reference to FIG. 7, the protection layer 305 functions to protect the transparent conductive film 304. Forming the protection layer 305 can be achieved with the following process. Chemical vapor deposition (CVD) is applied to form a protection layer 305 on the transparent conductive film 304 to cover the transparent conductive film 304. The material of the protection layer 305 can be nitrogen-silicon compounds (such as SiNx). When the material of the protection layer 305 is nitrogen-silicon compounds, the protection layer 305 can be formed of a thickness of 300 angstroms, or around 300 angstroms.

Figure 8:
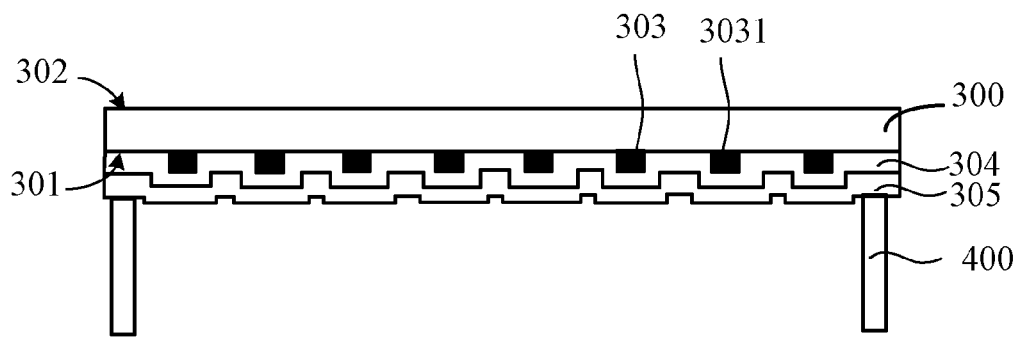

Step S700: forming a photo spacer 400 on the protection layer 305 in such a way that the photo spacer 400 is set to correspond to an edge of the third surface 301 of the second substrate 300 and the photo spacer 400 functions to support between the first substrate 100 and the second substrate 300. With additional reference to FIG. 8, forming the photo spacers 400 can be achieved with the following process. A spacer layer is formed on the protection layer 305 and the spacer layer is patternized so as to form the photo spacer 400 on the protection layer in such a way that the photo spacer 400 is set to correspond to the third surface 301 of the second substrate 300.

It can be appreciated that when the liquid crystal display 1 comprises no protection layer 305, this step is performed to form the photo spacer 400 on the conductive film 304 in such a way that the photo spacer 400 is set to correspond to the third surface 301 of the second substrate 300 and the photo spacers 400 functions to support between the first substrate 100 and the second substrate 300.

Step S800: filling liquid crystal molecules 500 into a receiving space 600 formed between the photo spacer 400 and the first substrate 100 and the second substrate 300.

Among these steps, Step S100 to Step S200 are steps that are involved in the manufacturing of the first substrate 100, while Steps S300 to S700 are steps involved in the manufacturing of the second substrate 300.

Figure 9:
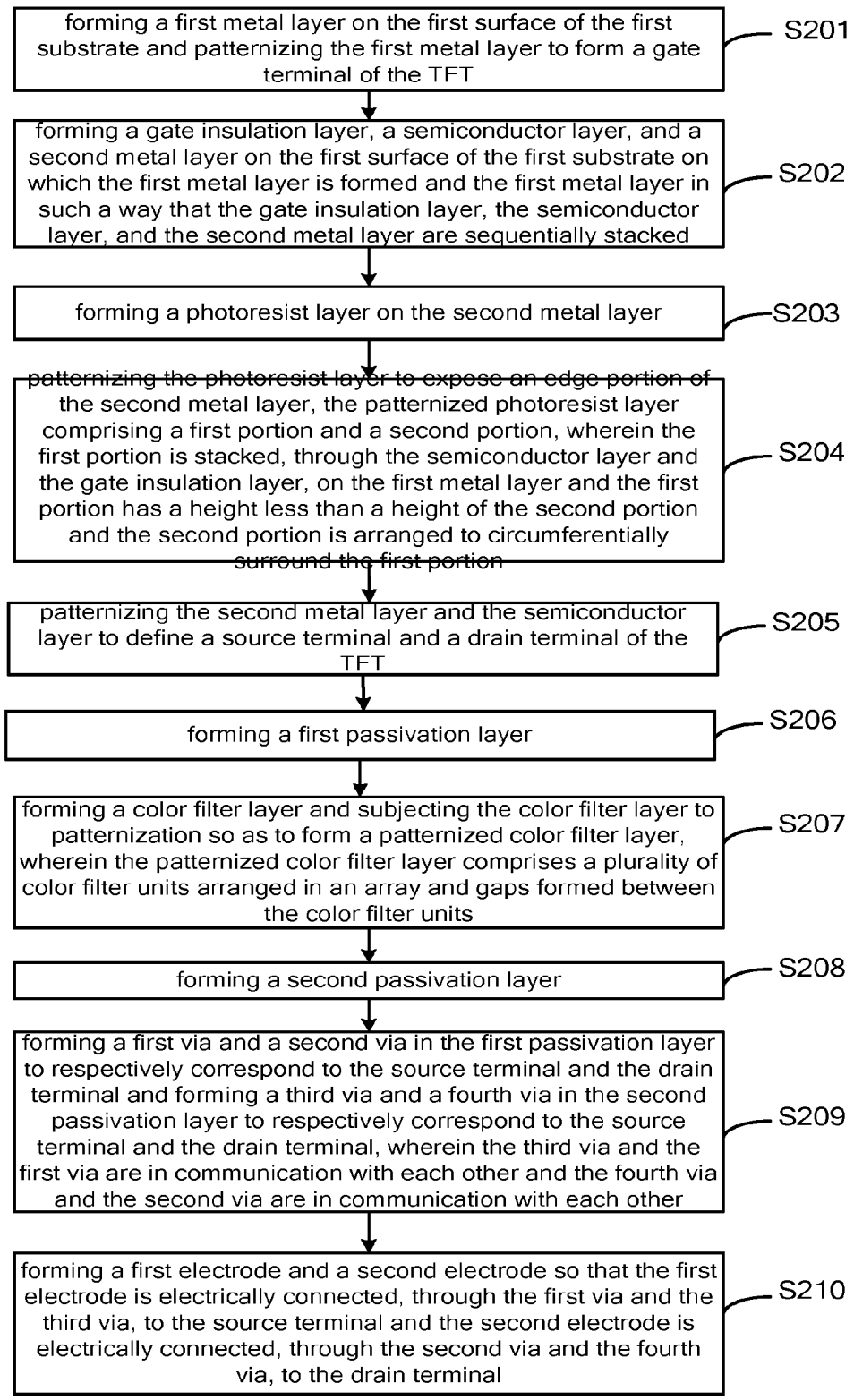
FIG. 9 is a sub-process flow chart illustrating step S200 of a manufacturing process of a first substrate according to the present invention.

A detailed description will be given to a process involved in Step S200 of the manufacturing of the first substrate 100. With additional reference to FIG. 9, a sub-process flow chart of Step S200, which constitutes partly the process for manufacturing the first substrate. Step S200 comprises the following steps. Since the TFT array 103 comprises a plurality of TFTs, to simplify the illustration, only one TFT of the TFT array 103 is illustrated in the subsequent drawings.

Figure 10:
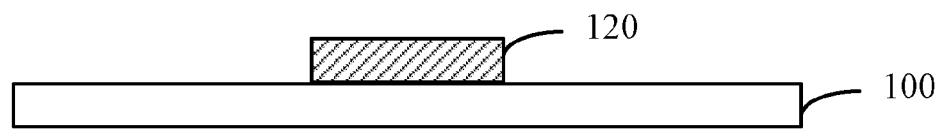
FIGS. 10-27 are cross-sectional views illustrating the first substrate of the liquid crystal display according to the present invention in various steps of the manufacturing process of the first substrate.

Step S201: forming a first metal layer 120 on the first surface 101 of the first substrate 100 and patternizing the first metal layer 120 to form a gate terminal of the TFT. Specifically, with additional reference to FIG. 10, the first metal layer is made of a material 120 that is selected as one of copper, tungsten, chromium, aluminum, and combinations thereof.

In another embodiment, in Step S201, the process of Step S200 may further comprise the following steps: forming a buffer layer (not shown) on the first substrate 100. The buffer layer functions to buffer stresses induced in the substrate 100 in manufacturing the TFT array 103 in order to prevent the first substrate 100 from being damaged or cracking. The material of the buffer layer is selected as one of silicon oxides, silicon nitrides, silicon oxynitrides, and combinations thereof. In this process, "forming a first metal layer 120 on the first surface 101 of the first substrate 100 and patternizing the first metal layer 120 to form a gate terminal of the TFT" of Step S201 can specifically be as follows. The first metal layer 120 is arranged, through the buffer layer, on the first surface 101 of the first substrate 100 and the first metal layer 120 is patternized to form the gate terminal of the TFT. In other words, the buffer layer is formed on the first surface 101 of the first substrate 100 and the first metal layer 120 is formed on the buffer layer so that the first metal layer, the buffer layer and the first substrate 100 are arranged to stack sequentially over each other. The first metal layer is then patternized to form the gate terminal of the TFT.

Step S202: forming a gate insulation layer 130, a semiconductor layer 140, and a second metal layer 150 on the first surface 101 of the first substrate 100 on which the first metal layer 120 is formed and the first metal layer 120 in such a way that the gate insulation layer 130, the semiconductor layer 140, and the second metal layer 150 are sequentially stacked. The gate insulation layer 130 is closer to the first surface 101 on which the first metal layer 120 is formed and the first metal layer 120 than the semiconductor layer 140 and the second metal layer 150 are.

Figure 11:
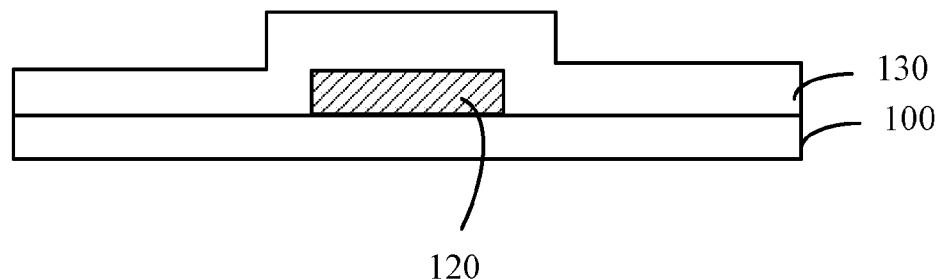
Figure 12:
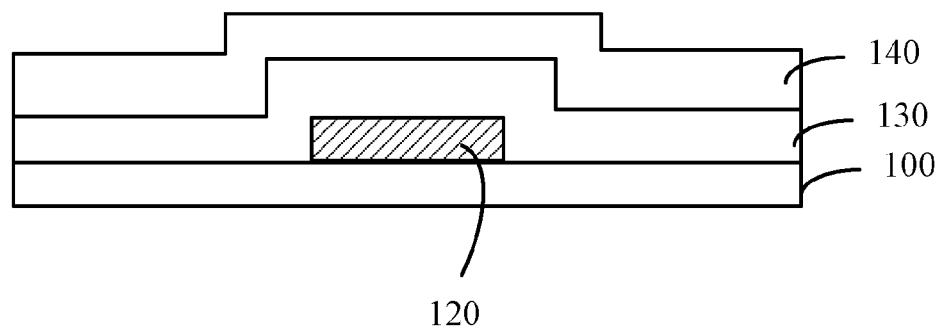
Figure 13:
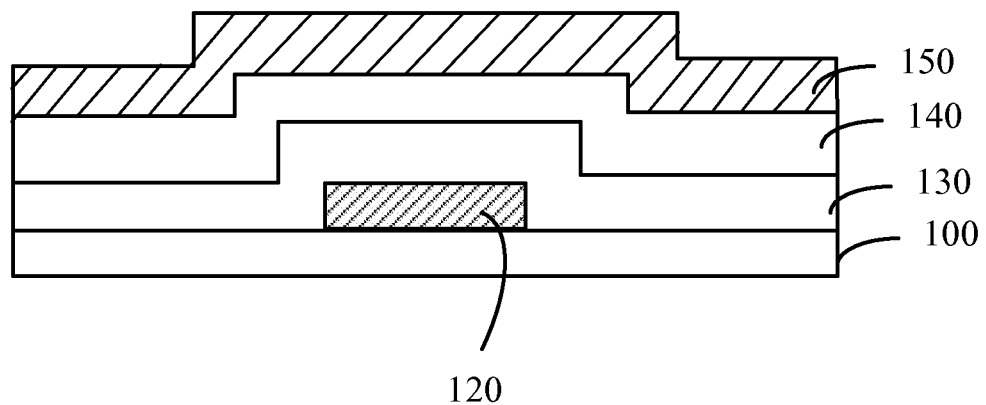

Specifically, with additional reference to FIG. 11, since the first metal layer 120 is set on the first surface 101 of the first substrate 100, the gate insulation layer 130 is formed on a portion of the first surface 101 that is not covered by the first metal layer 120 and the first metal layer 120. The material of the gate insulation layer 130 is selected as one of silicon oxides, silicon nitrides, silicon oxynitrides, and combinations thereof. With additional reference to FIG. 12, the semiconductor layer 140 is formed on the gate insulation layer 130 in such a way that the semiconductor layer 140 and the gate insulation layer 130 are sequentially stacked. With additional reference to FIG. 13, the second metal layer 150 is formed on the semiconductor layer 140 in such a way that the second metal layer 150 and the semiconductor layer 140 and the gate insulation layer 130 are sequentially stacked. The material of the second metal layer 150 is selected as one of copper, tungsten, chromium, aluminum, and combinations thereof.

In another embodiment, the semiconductor layer 140 comprises a channel layer (not shown) and an ohmic contact layer (not shown). The channel layer is set on and covers the gate insulation layer 130; the ohmic contact layer is set on and covers the channel layer; and the second metal layer is set on and covers the ohmic contact layer.

Figure 14:
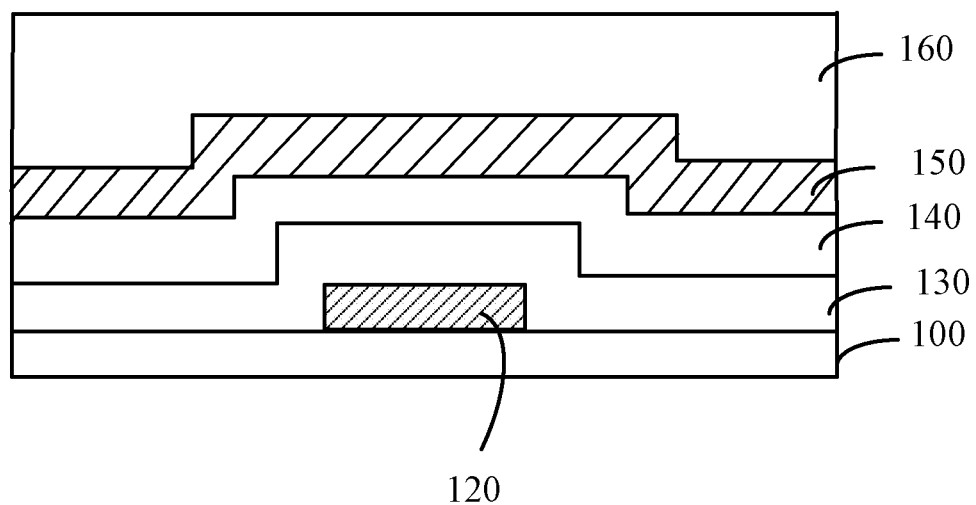

Step S203: forming a photoresist layer 160 on the second metal layer 150. With additional reference to FIG. 14, the photoresist layer 160 has an upper surface that can be a horizontal plane.

Step S204: patternizing the photoresist layer 160 to expose an edge portion of the second metal layer 150, the patternized photoresist layer 160 comprising a first portion 163 and a second portion 164, wherein the first portion 163 is stacked, through the semiconductor layer 140 and the gate insulation layer 130, on the first metal layer 120 and the first portion 163 has a height less than a height of the second portion 164 and the second portion 164 is arranged to circumferentially surround the first portion 163.

Figure 15:
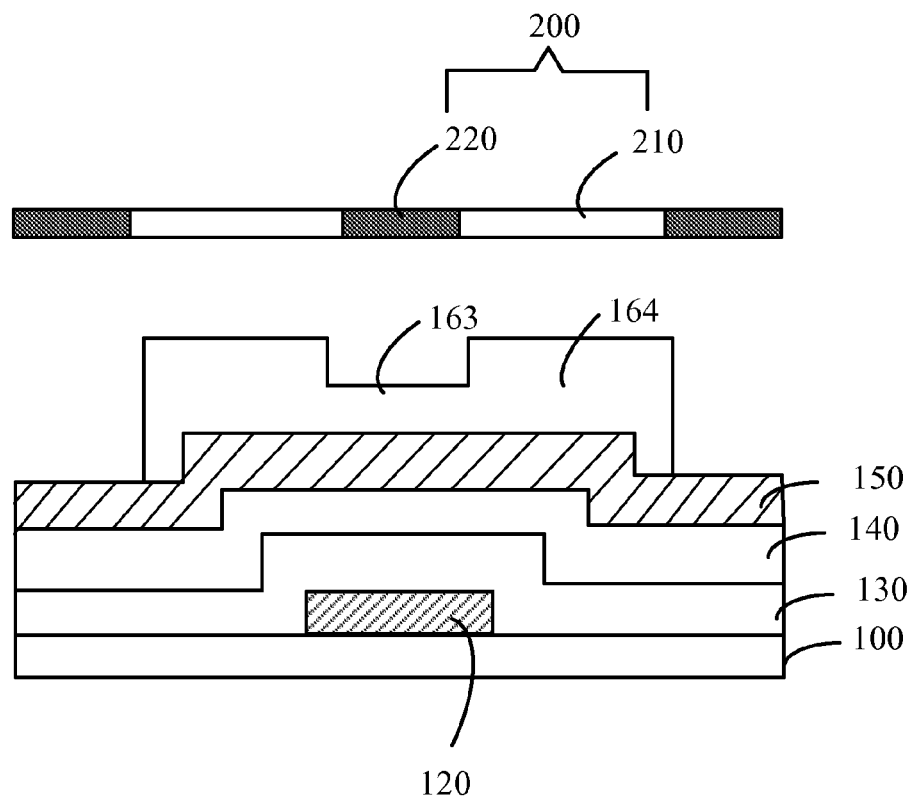

Specifically, in the instant embodiment, with additional reference to FIG. 15, a mask 200 and a light source (not shown) arranged on one side of the mask 200 that is distant from the photoresist layer 160 are provided. The light source generates light and the light get incident on the surface of the mask 200 that is distant from the photoresist layer 160. The mask 200 is arranged above the photoresist layer 160 and the mask 200 comprises two light transmitting sections 210 and three light shielding sections 220. Two opposite ends and a middle of the mask 200 are respectively the light shielding sections 220, and the light transmitting sections 210 are each set between two adjacent ones of the light shielding sections 220 so that the light transmitting sections 210 and the light shielding sections 220 are arranged alternately. The light shielding section 220 in the middle of the mask 200 has a lateral dimension that is slightly less than the dimension of the gate terminal 120 in the same direction. When the light irradiates the light transmitting sections 210, the light passes through the light transmitting sections 210 to irradiate the photoresist layer 160. When the light irradiates the light shielding sections 220, the light cannot pass through the light shielding sections 220 to irradiate the photoresist layer 160.

In the instant embodiment, the photoresist layer 160 is made of a photoresist material that is negative photoresist, meaning when irradiated by light, the photoresist layer 160 does not dissolve, while the photoresist layer 160 that is not irradiated by light dissolves. Thus, with the mask 200 arranged above ∓ the photoresist layer 160, the portions of the photoresist layer 160 that are located below the light transmitting sections 210 of the mask 200 do not dissolve and portions of the photoresist layer 160 that are located below the light shielding sections 220 of the mask 200 dissolves. With the mask 200, the photoresist layer 160 is patterned to show the pattern illustrated in FIG. 9. Namely, the portions of the photoresist layer 160 corresponding to the light shielding sections 220 at two ends of the mask 200 completely dissolve to expose the edge portions of the second metal layer 150 and the portion of photoresist layer 160 corresponding to the light shielding sections 220 in the middle of the mask 200 partly dissolves to form the first portion 163 of the photoresist layer 160, while the portions of the photoresist layer corresponding to and below the light transmitting sections 220 of the mask 200 do not dissolve so as to form the second portion 164 of the photoresist layer 160.

Step S205: patternizing the second metal layer 150 and the semiconductor layer 140 to define a source terminal and a drain terminal of the TFT. Specifically, Step S205 may comprise the followings steps.

Figure 16:
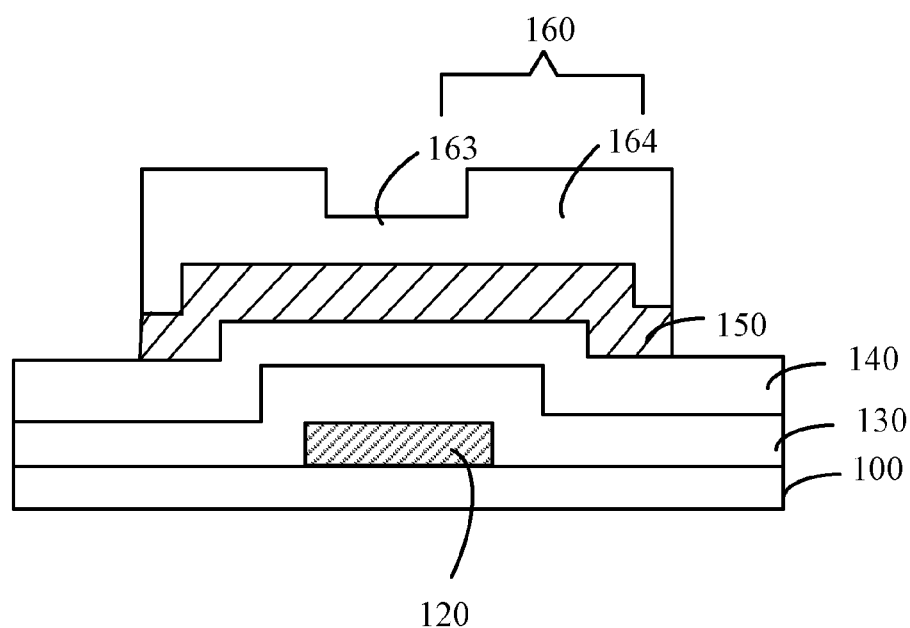

With additional reference to FIG. 16, portions of the second metal layer 150 that are not covered by the photoresist layer 160 are removed.

Figure 17:
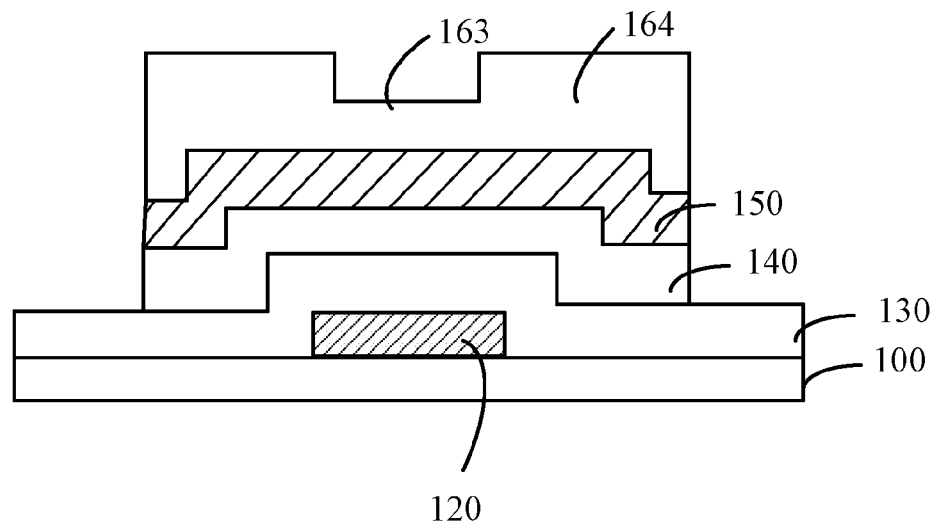

With additional reference to FIG. 17, portions of the semiconductor layer 140 that are not covered by the second metal layer 150 are removed.

Figure 18:
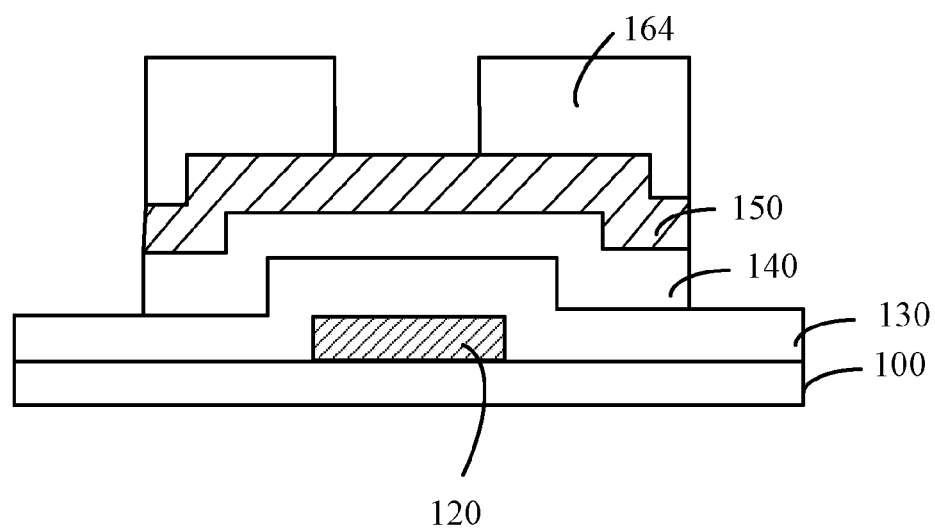
Figure 19:
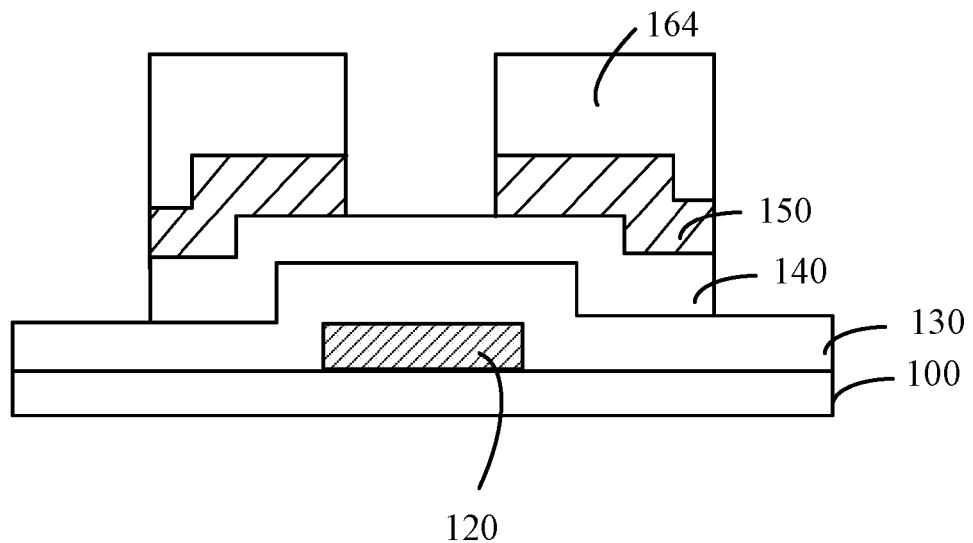
Figure 20:
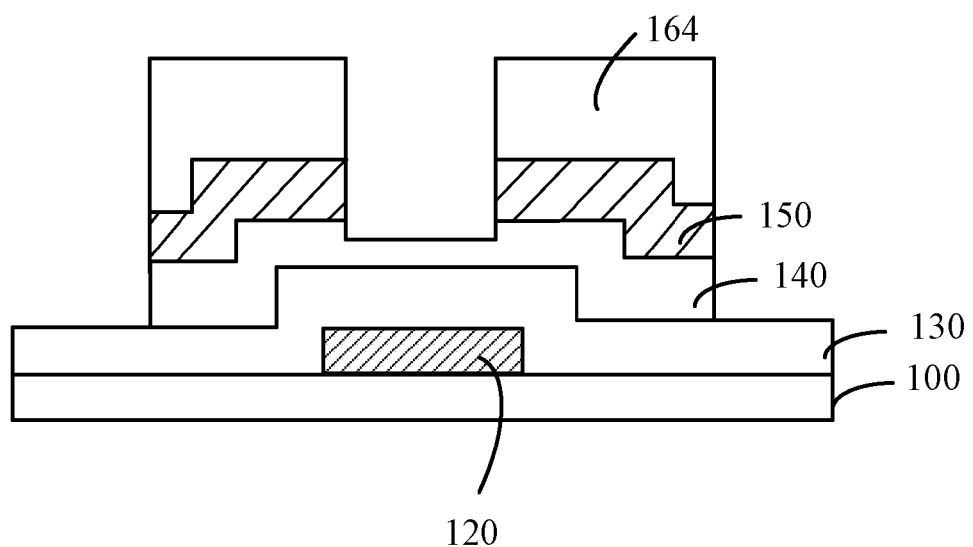

With additional reference to FIG. 18, the first portion 163 of the photoresist layer 160 is removed; with additional reference to FIG. 19, the portion of the second metal layer 150 that was originally covered by the first portion 163 of the photoresist layer 160 is removed; and referring to FIG. 20, the portion of the semiconductor layer 140 that was originally covered by the first portion 163 of the photoresist layer 160 is partly removed.

Figure 21:
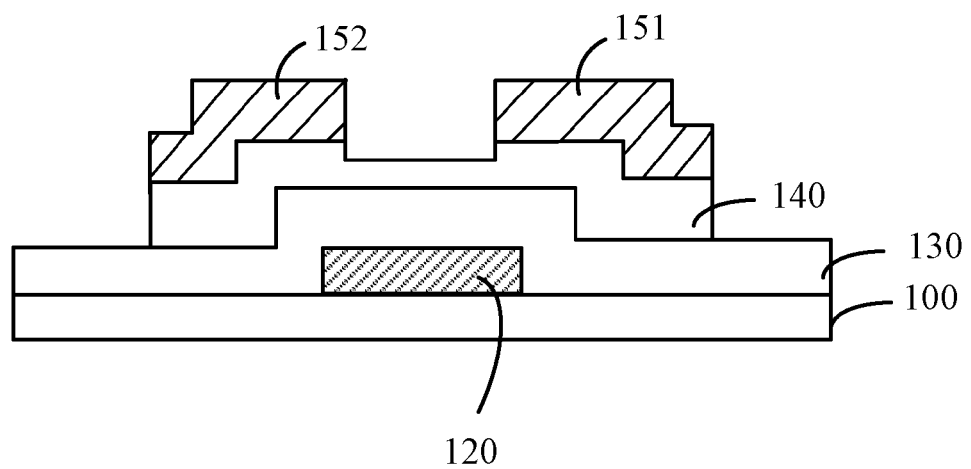

Referring to FIG. 21, the second portion 164 of the photoresist layer 160 is removed. With the above-described steps illustrated in FIGS. 16-21, the source terminal 151 and the drain terminal 152 of the TFT are formed. And, through the above-described steps, the TFT is formed.

Figure 22:
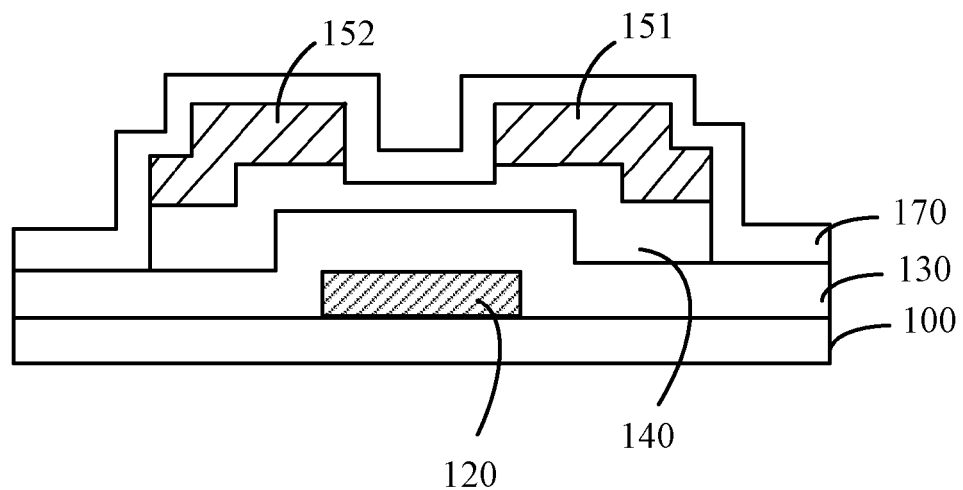

Step S206: forming a first passivation layer 170. Specifically, with additional reference to FIG. 22, the first passivation layer 170 is formed on the source terminal 151, the drain terminal 152, and an exposed surface of the gate insulation layer 130. The material of the first passivation layer 170 can be nitrogen-silicon compounds, such as SiNx.

Figure 23:
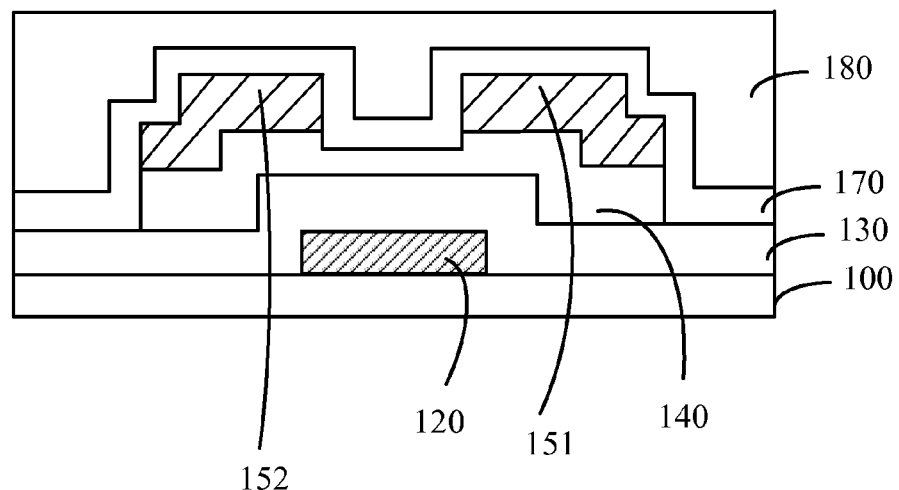
Figure 24:
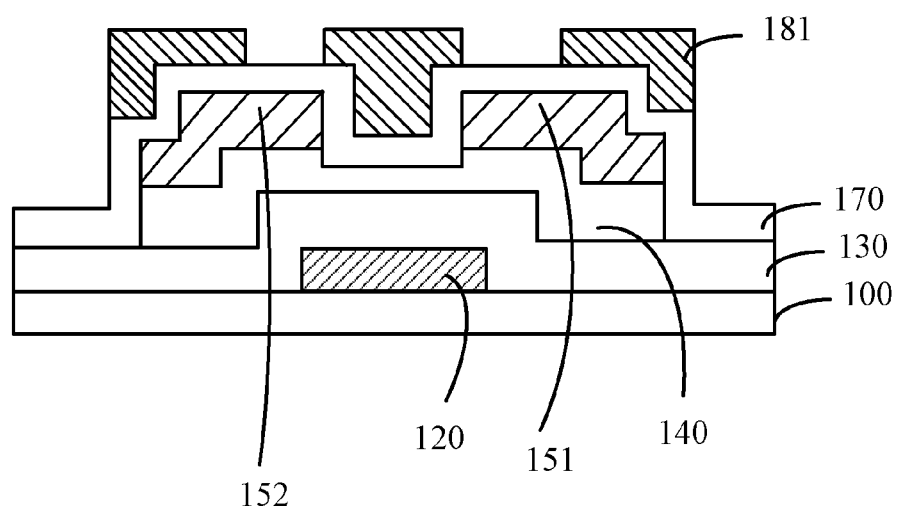

Step S207: forming a color filter layer 180 and subjecting the color filter layer 180 to patternization so as to form a patternized color filter layer 180, wherein the patternized color filter layer 180 comprises a plurality of color filter units 181 arranged in an array and gaps 182 formed between the color filter units 181. With additional reference to FIG. 23, the color filter layer 180 is formed on the first passivation layer 170. With additional reference to FIG. 24, the color filter layer 180 is patternized to form the plurality of color filter units 181 that is arranged in an array with the gaps 182 formed between the color filter units 181. The color filter units 181 can be red (R), green (G), and blue (B) filter units.

Figure 25:
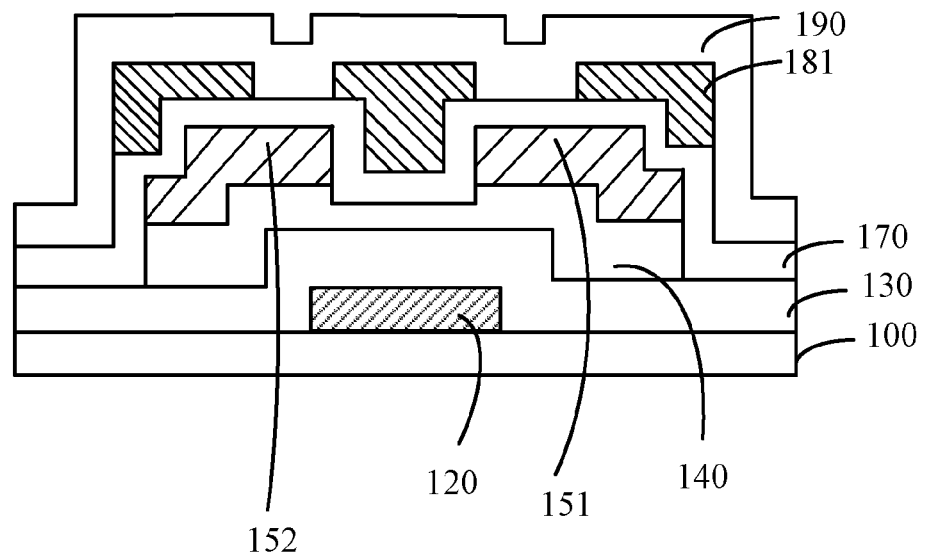

Step S208: forming a second passivation layer 190. Specifically, with additional reference to FIG. 25, the second passivation layer 190 is formed on the patternized color filter layer 180 and the surface of the second passivation layer 170 that is not covered by the color filter units 181.

Figure 26:
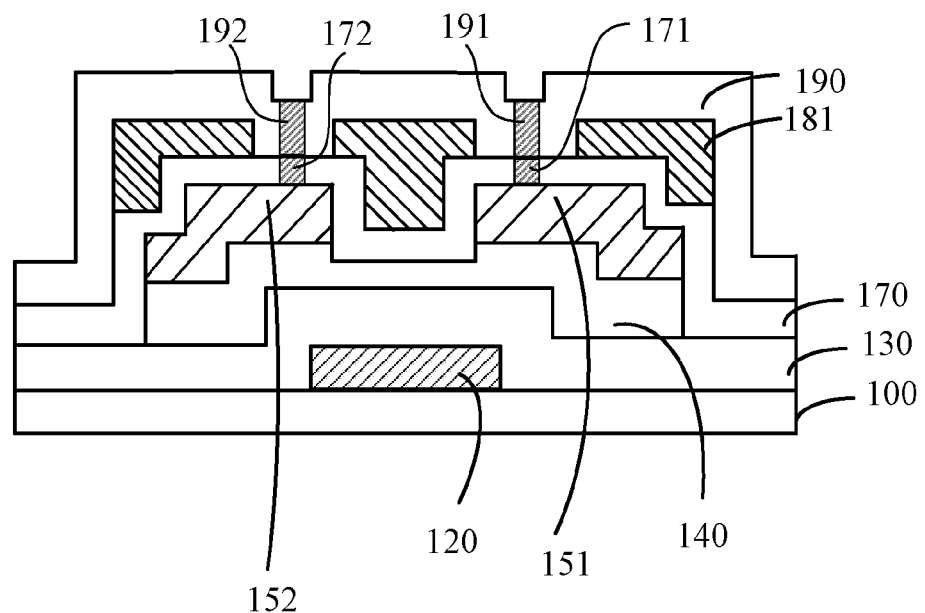

Step S209: forming a first via 171 and a second via 172 in the first passivation layer 170 to respectively correspond to the source terminal 151 and the drain terminal 152 and forming a third via 191 and a fourth via 192 in the second passivation layer 190 to respectively correspond to the source terminal 151 and the drain terminal 152, wherein the third via 191 and the first via 171 are in communication with each other and the fourth via 192 and the second via 172 are in communication with each other, see FIG. 26.

Figure 27:
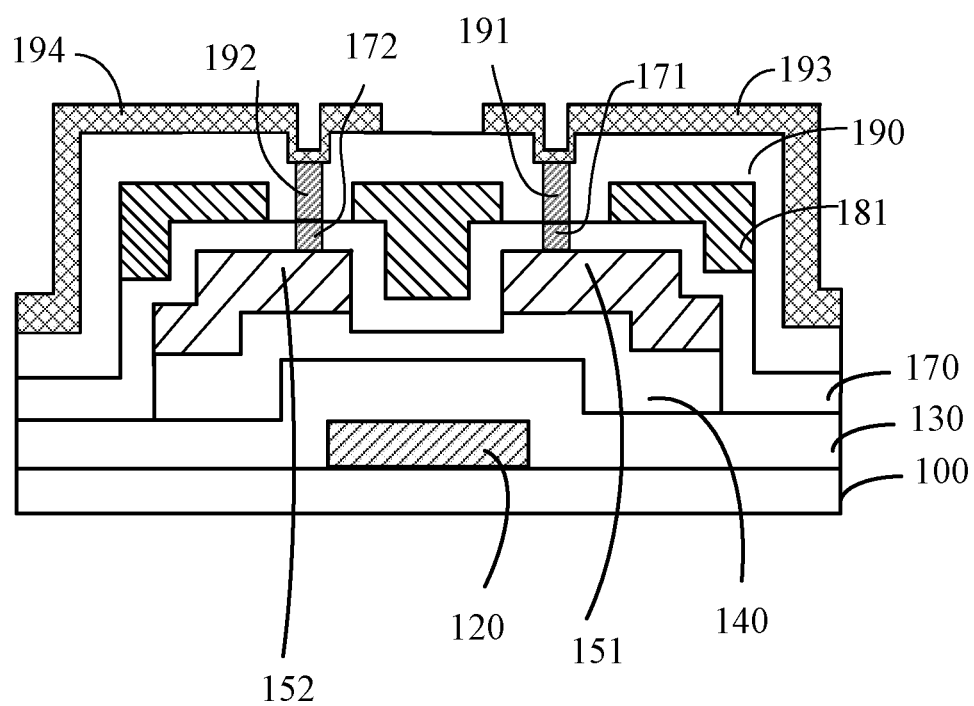

Step S210: forming a first electrode 193 and a second electrode 194 so that the first electrode 193 is electrically connected, through the first via 171 and the third via 191, to the source terminal 193 and the second electrode 194 is electrically connected, through the second via 172 and the fourth via 192, to the drain terminal 152. With additional reference to FIG. 27, the first electrode 193 and the second electrode 194 function as pixel electrodes and the first electrode 193 is electrically connected to the source terminal 151 and the second electrode 194 is electrically connected to the drain terminal 152 so that the TFT may control the pixel electrodes. In the instant embodiment, the material of the first electrode 193 and the second electrode 194 is ITO and under this condition, the first electrode 193 and the second electrode 194 have thicknesses of 1000 angstroms to 1500 angstroms.

In the method for manufacturing a liquid crystal display according to the present invention, since the material of the black matrix layer 303 is molybdenum and molybdenum does not cause pollution to the environment, the liquid crystal display 1 provided by the present invention is more environment-friendly.

Since the material of the black matrixes 3031 is molybdenum, the black matrixes 3031 may be formed of a thickness of 100 angstroms to 1000 angstroms. The prior art black matrixes, however, generally have thicknesses of 1 micrometer. Thus, compared to the prior art, the black matrixes 3031 of the present invention has a thickness that is less than the thickness of the prior art black matrixes, thus facilitating spreading of the liquid crystal molecules 500 arranged between the first substrate 100 and the second substrate 300 and also facilitating spreading of an alignment solution to thereby enhance the quality of the liquid crystal display 1 so manufactured.

Disclosed above is only one preferred embodiment of the present invention, which does not impose undue constraints to the scope of protection of the present invention. Those having ordinary skills of the art may readily appreciate that equivalent modifications that allow for realization of all or part of the operation process of the preferred embodiment described above and comply with the requirement defined in the appended claims are considered within the protection scope covered by the present invention.

What is claimed is:

1. A liquid crystal display, comprising:
   a first substrate, which comprises a first surface and a second surface opposite to the first surface, the first surface of the first substrate comprising a thin-film transistor (TFT) array and a color filter layer formed thereon, the color filter layer comprising a plurality of color filter units arranged in an array, gaps formed between the color filter units;
   a second substrate, which comprises a third surface and a fourth surface opposite to the third surface, the third surface and the first surface facing each other, the third surface comprising a black matrix layer formed thereon, the black matrix layer comprising a plurality of black matrixes, the black matrixes being arranged to correspond to the gaps between the plurality of color filter units, the black matrix layer being coated thereon with a layer of transparent conductive film, a material that makes the black matrix layer being molybdenum; and a liquid crystal layer, which is interposed between the first substrate and the second substrate and is located between the black matrix layer that is formed on the second substrate and the TFT array and the color filter layer that are formed on the first substrate;

wherein the black matrix layer comprises a layer of molybdenum having a first side directly on the third surface of the second substrate and an opposite second side on which the transparent conductive film is directly formed.

2. The liquid crystal display as claimed in claim 1, wherein the black matrixes have a thickness of 100 angstroms to 1000 angstroms.

3. The liquid crystal display as claimed in claim 1, wherein the liquid crystal display further comprises a photo spacer, the photo spacer being formed on the transparent conductive film and the photo spacer being arranged to correspond to an edge of the third surface of the second substrate, the photo spacer functioning to support between the first substrate and the second substrate.

4. The liquid crystal display as claimed in claim 1, wherein the second substrate further comprises a protection layer, the protection layer being set on and covering the transparent conductive film.

5. The liquid crystal display as claimed in claim 4, wherein the liquid crystal display further comprises a photo spacer, the photo spacer being formed on the protection layer and the photo spacer being arranged to correspond to an edge of the third surface of the second substrate, the photo spacer functioning to support between the first substrate and the second substrate.

6. The liquid crystal display as claimed in claim 4, wherein the protection layer comprises a nitrogen-silicon compound.

7. The liquid crystal display as claimed in claim 6, wherein the protection layer has a thickness of 300 angstroms.

8. The liquid crystal display as claimed in claim 1, wherein a material of the transparent conductive film is indium tin oxide (ITO), the ITO having a thickness of 300 angstroms to 600 angstroms.

* * * * *